United States Patent [19]
Tani

[11] Patent Number: 5,187,569
[45] Date of Patent: Feb. 16, 1993

[54] SOLID STATE IMAGING DEVICE AND ELECTRONIC STILL CAMERA USING SAME

[75] Inventor: Nobuhiro Tani, Tokyo, Japan

[73] Assignee: Asahi Kogaku Kogyo Kabushiki Kaisha, Tokyo, Japan

[21] Appl. No.: 885,244

[22] Filed: May 20, 1992

Related U.S. Application Data

[63] Continuation of Ser. No. 486,160, Feb. 28, 1990, abandoned.

[30] Foreign Application Priority Data

Mar. 3, 1989 [JP] Japan ................................. 1-517310

[51] Int. Cl.⁵ ............................................. H04N 9/04
[52] U.S. Cl. ................................ 358/50; 358/213.11; 358/213.22; 358/213.23; 358/213.13; 358/482
[58] Field of Search ................ 358/41, 44, 50, 213.23, 358/213.26, 213.28, 213.29, 482, 483, 213.11, 213.22, 213.13

[56] References Cited

U.S. PATENT DOCUMENTS

| | | | |
|---|---|---|---|
| 4,237,477 | 12/1980 | Weimer | 358/44 |
| 4,367,492 | 1/1983 | Harada et al. | 358/213.29 |
| 4,638,362 | 1/1987 | Oshima et al. | 358/213.26 |
| 4,829,368 | 5/1989 | Kobayashi et al. | 358/41 |
| 4,868,667 | 9/1989 | Tani et al. | 358/227 |
| 4,876,590 | 10/1989 | Parulski | 358/41 |
| 4,876,603 | 10/1989 | Suzuki et al. | 358/227 |

FOREIGN PATENT DOCUMENTS

| | | |
|---|---|---|
| 0244655 | 11/1987 | European Pat. Off. |
| 0280511 | 8/1988 | European Pat. Off. |
| 0289944 | 11/1988 | European Pat. Off. |
| 63-20987 | 1/1988 | Japan |
| 63-24781 | 2/1988 | Japan |
| 2542919 | 9/1984 | France |
| 62-277878 | 12/1987 | Japan |

Primary Examiner—Edward L. Coles, Sr.
Assistant Examiner—Jill Jackson
Attorney, Agent, or Firm—Sandler, Greenblum & Bernstein

[57] ABSTRACT

A solid state imaging device includes photosensitive portions which accumulate electrical charges corresponding to the quantity of light received thereby. Also included are vertical transfer portions which accumulate electrical charges corresponding to the quantity of light received thereby and which transfer the electrical charges accumulated by the photosensitive portions. Color filters are alternately arranged in a predetermined order on the photosensitive portions or the vertical transfer portions to permit the associated colors to pass therethrough. The invention is also directed to an electronic still camera having such a solid state imaging device, a signal memory for memorizing the signal data generated by the vertical transfer portions, and a picture signal generator for synchronizing the signal data memorized by the memory and the corresponding signal data read by the photosensitive portions to form a picture signals.

29 Claims, 8 Drawing Sheets

SOLID STATE IMAGING DEVICE AND ELECTRONIC STILL CAMERA USING SAME

This application is a continuation of application Ser. No. 07/486,160, filed Feb. 28, 1990, now abandoned.

BACKGROUND OF THE INVENTION

1. Field of the Invention

The present invention relates to a solid state imaging device in which a color signal and a luminance signal needed to form a color image are simultaneously generated, and an electronic still camera in which such a solid state imaging device is used to reproduce a color image having a high resolution.

2. Description of Related Art

Recently, various electronic still cameras (still video cameras) in which an imaging device for converting an object image to electrical signals and a magnetic disk (video floppy) for recording the electrical signals are used to record a still image in place of a conventional silver salt film have been developed.

FIG. 6 shows an IL-CCD (inter-line type CCD) which is one of the known imaging devices used in electronic still cameras. In an arrangement shown in FIG. 6, a plurality of rows of photosensitive portions 101, each row consisting of a large number of picture elements (photodiodes) 103 which are continuously vertically arranged, and a plurality of rows of vertical transfer portions (vertical transfer CCD's) 105 are alternately arranged side by side. The electrical charges accumulated in the picture elements 103 are transferred to the associated vertical transfer portions 105 at one time, so that the electrical charges which are transferred in the vertical transfer portions 105 in the vertical direction are stepwise transferred to a horizontal transfer portion (not shown). As a result, each line of the electrical charges transferred to the horizontal transfer portions can be read by the horizontal transfer portion.

The photosensitive portions 101 are provided, on their photosensitive surfaces (light receiving surfaces of the picture elements 103), with complementary color filters through which only yellow light (Ye), cyan light (Cy) and magenta light (Mg) can be transmitted, as shown in FIG. 7, or primary color filters through which only red light (R), green light (G) and blue light (B) can be transmitted, as shown in FIG. 8. The color signals for forming a color image are obtained by the electrical charges accumulated in the picture elements 103 which receive light through the color filters.

The vertical transfer portions 105 are provided on their light receiving surfaces, with light intercepting layers, so that only the electrical charges transferred from the photosensitive portions 101 can be accumulated.

However, in comparison with a conventional silver salt picture, an electronic still camera using a solid state imaging device of the kind mentioned above has a low picture quality. In particular, the resolution of the electronic still camera using a solid state imaging device is not comparable to that of the silver salt picture.

In order to increase the resolution, it is necessary to increase the density of the picture elements of the solid state imaging device or to provide separate imaging devices for signal components of red light, green light and blue light (so-called three tube camera).

However, as a matter of course, the provision of a plurality of solid state imaging devices results in a complex and expensive camera.

On the other hand, there are limitations to an increase of the density of the picture elements under modern techniques, and accordingly, it is very difficult to practically realize an inexpensive electronic still camera having a high resolution.

SUMMARY OF THE INVENTION

The primary object of the present invention is to provide a solid state imaging device in which a high quality picture of high resolution can be formed by a single imaging device and an electronic still camera using such a single solid state imaging device.

The inventors of the present application have focused on a photoelectric conversion function and an electrical charge accumulation function of the vertical transfer portions of the solid state imaging device.

To achieve the object mentioned above, according to the present invention, there is provided a solid state imaging device comprising photosensitive portions which accumulate electrical charges corresponding to the amount of light received thereby, and vertical transfer portions which accumulate electrical charges corresponding to the amount of light received thereby and which transfer the electrical charges accumulated by the photosensitive portions. The photosensitive portions and said vertical transfer portions are alternately placed in the horizontal direction, wherein the vertical transfer portions have light receiving surfaces, each having transparent electrodes, and color filters of three primaries which permit three primary colors to pass therethrough are alternately located in a predetermined order.

With this arrangement, since the vertical transfer portions on which the color filters are provided accumulate the electrical charges corresponding to the amount of light incident thereupon through the color filters, a color signal can be obtained by the vertical transfer portions. On the other hand, since the photosensitive portions accumulate the electrical charges corresponding to the amount of incident light, a luminance signal can be obtained by the photosensitive portions.

As can be understood from the foregoing, according to the present invention, the vertical transfer portions which were used only to transfer the electrical charges accumulated in the photosensitive portions in the prior art are used also as a photosensitive portions, thus resulting in an enhanced utilization efficiency of incident light and an increased horizontal resolution.

As an alternative, it is possible to provide color filters of the primaries on the photosensitive portions in a predetermined alternate order. In this alternative, the transparent electrodes are provided on each of the light receiving surfaces of the vertical transfer portions to transmit incident light therethrough, so that the color signal and the luminance signal can be obtained by the photosensitive portions and the vertical transfer portions, respectively. Consequently, both the color signal and the luminance signal can be obtained by a single imaging device with high density.

According to another aspect of the present invention, there is provided an electronic still camera which comprises a solid state imaging device as constructed above, and including a signal memory for storing the color signal data or the luminance signal data generated by the vertical transfer portions of the solid state imaging device. An image signal forming device is provided for forming an object image signal in accordance with the luminance signal or the color signal formed by the photosensitive portions and the color signal or the luminance signal which is stored in the signal memory and which is synchronized with the luminance signal or the color signal formed by the photosensitive portions.

With this arrangement, the color signal and the luminance signal can be independently obtained by a single solid state imaging device, so that an object image having high resolution can be inexpensively formed.

Furthermore, in an electronic still camera according to the present invention, the electrical charges accumulated through the color filters are used as information on a color signal for forming an object image and the electrical charges accumulated not through the color filters are used as information on a luminance signal for forming an object image, in the single solid state imaging device. Accordingly, both the color signal and the luminance signal can be obtained from a single solid state imaging device with high density.

BRIEF DESCRIPTION OF THE DRAWINGS

The invention will be described below in detail with reference to the accompanying drawings, in which.

DESCRIPTION OF PREFERRED EMBODIMENTS

The following description will be directed to preferred embodiments of a solid state imaging device and an electronic still camera using such a solid state imaging device, according to the present invention.

Figure 1A:
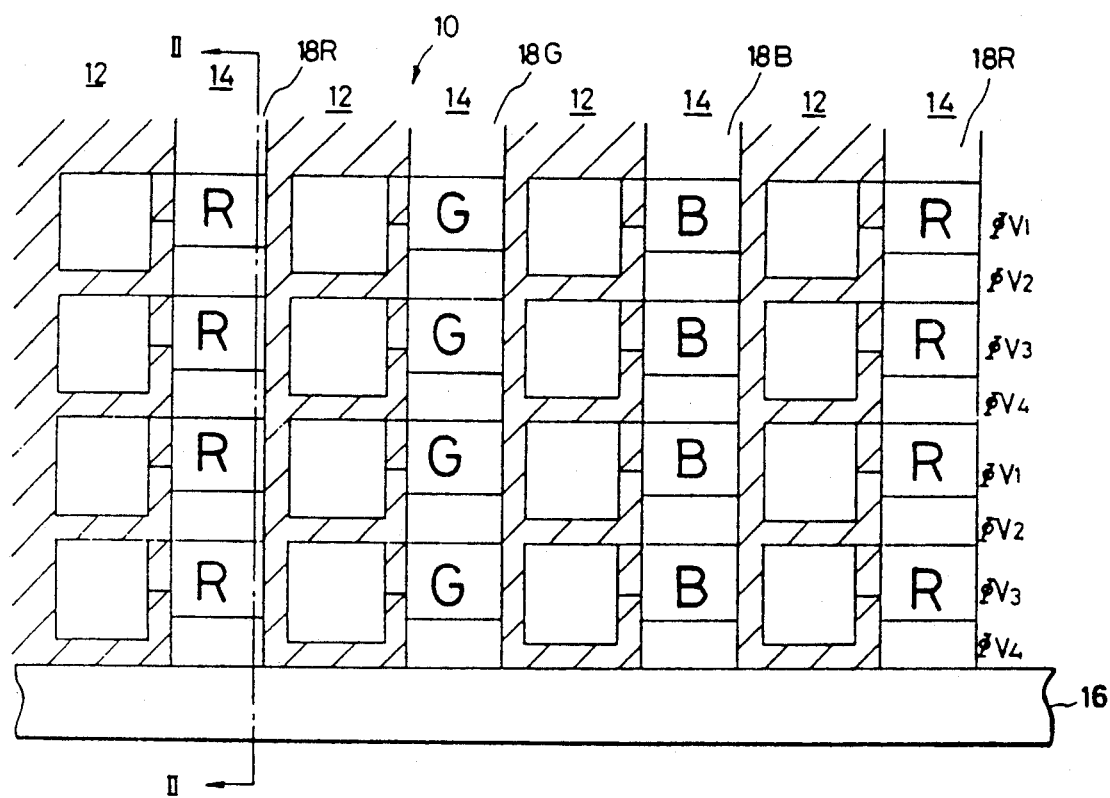
FIGS. 1A and 1B are different schematic plan view of a solid state imaging device according to an aspect of the present invention.

FIG. 1A shows a construction of a solid state imaging device 10 according to an aspect of the present invention.

Figure 1B:
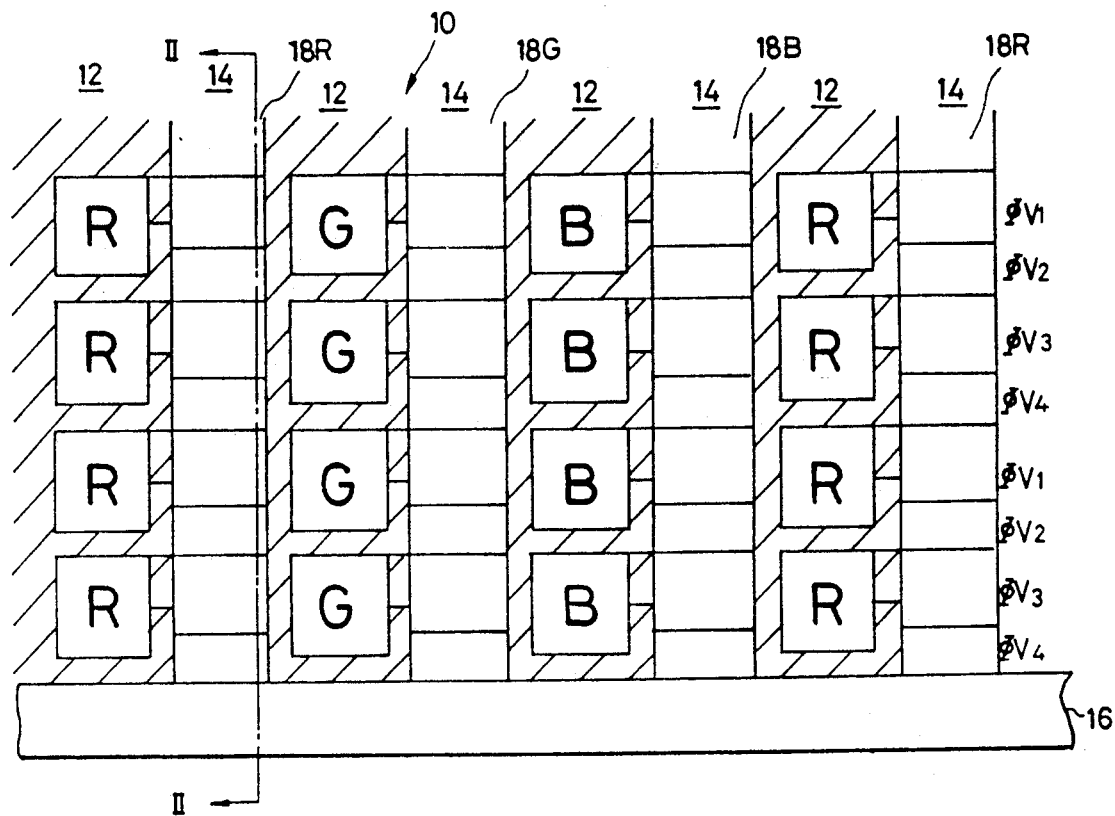
Figure 2:
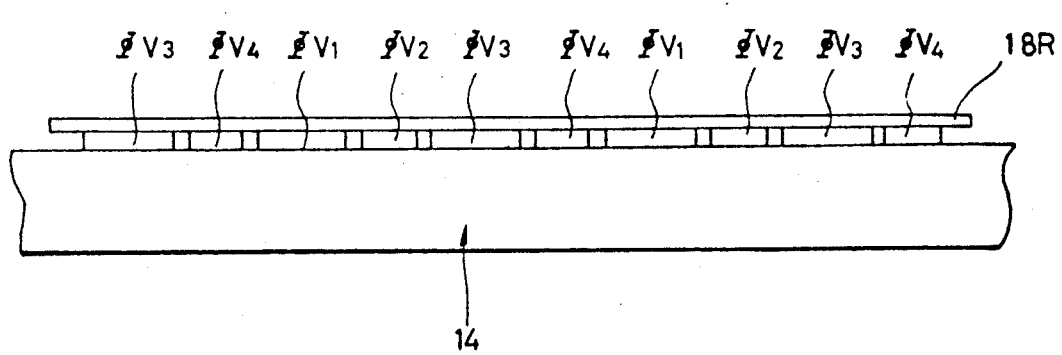
FIG. 2 is a sectional view taken along the line II—II in FIG. 1A.

The basic construction of the photosensitive portion of the solid state imaging device 10 shown in FIG. 1 is similar to that of a conventional inter-line type of solid state imaging device. Namely, the solid state imaging device 10 has photosensitive portions 12 having photodiodes (picture elements) 13 which accumulate the electrical charges corresponding to the amount of light incident thereupon, vertical transfer portions 14 to which the electrical charges accumulated by the photodiodes 13 are transferred at one time to successively transfer the electrical charges, and a horizontal transfer portion 16 which reads each line of the electrical charges transferred by the vertical transfer portions 14.

Note that the photosensitive portions 12, the vertical transfer portions 14 and the horizontal transfer portion 16 are formed on a same integrated circuit board.

The photosensitive portions 12 and the vertical transfer portions 14 are alternately located side by side in the vertical direction. Each row of the photosensitive portion 12 has a large number of photodiodes 13 which are independently arranged in the vertical direction with high density.

The light receiving surfaces (photosensitive surfaces) of the vertical transfer portions 14 has a pair of transparent electrodes $\Phi V$ of, for example polysilicon or the like through which almost all (nearly 100%) of visible light can be transmitted. The transparent electrodes $\Phi V$ are located to correspond to the associated photodiodes 13 of the associated vertical transfer portions 12 on one side thereof.

In the illustrated embodiment which is applied to a four-phase drive, each pair consists of four transparent electrodes $\Phi V1 \sim \Phi V4$, so that a plurality of electrode pairs are successively arranged.

The transparent electrodes $\Phi V$ are provided on their surfaces with stripe filters having primary color filters 18R, 18G and 18B for three primary colors of red (R), green (G) and blue (B) which are arranged successively in the vertical direction and regularly in the horizontal direction to correspond to the vertical transfer portions 14. Upon recording on the floppy disk, the recording band of the color signal is about 1 MHZ at the most. This is the reason that the stripe filters are used. Color filters which are located in a mosaic arrangement can be used, which however has a decreased S/N ratio and less color reproductivity of the color signal.

An object image is formed on the surface (light receiving surface) of the solid state imaging device 10 by a photographing lens.

In the solid state imaging device 10 as constructed above, the electrical charges corresponding to the intensity or the quantity of light incident upon the photosensitive portions 12 (photodiodes 13) are accumulated therein, regardless of the wavelength (color) of the incident light. Consequently, if the signal charges accumulated in the photosensitive portions 12 are used as a luminance signal, a resolution similar to that of a conventional monochromatic solid state imaging device having no color filter is achieved.

Light is made incident also on the vertical transfer portions 14, through the color filters 18R, 18G and 18B, so that the electrical charges corresponding to the quantities of these color components are accumulated in the vertical transfer portions 14. The signal charges which are signals corresponding to the color components transmitted through the respective color filters are used as a color signal.

The quantity of information which is obtained as the color signal of three primary colors is one third that of the information quantity of the luminance signal. However, since human eyesight is more sensitive to luminance than to color, the quantity of color information can be considered to be sufficient.

Thus, according to the present invention, ideal color and luminance signals corresponding to characteristics of human eyesight can be obtained with a high density by a single solid state imaging device.

Furthermore, in order to further increase the resolution of the luminance signal, it is possible to decrease the resolution of the color signal within an allowable limit to obtain the luminance signal from the vertical transfer portions 14. Namely, the color filters are thinned out on the vertical transfer portions 14, so that the color signal is obtained by the vertical transfer portions 14 on which the color filters are provided and the luminance signal is obtained by the photosensitive portions 12 and the vertical transfer portions 14 having no color filter.

In case of a monochromatic picture, no color filter is necessary, and accordingly the luminance signal can be obtained from all of the photosensitive portions 12 and the vertical transfer portions 14.

Figure 3:
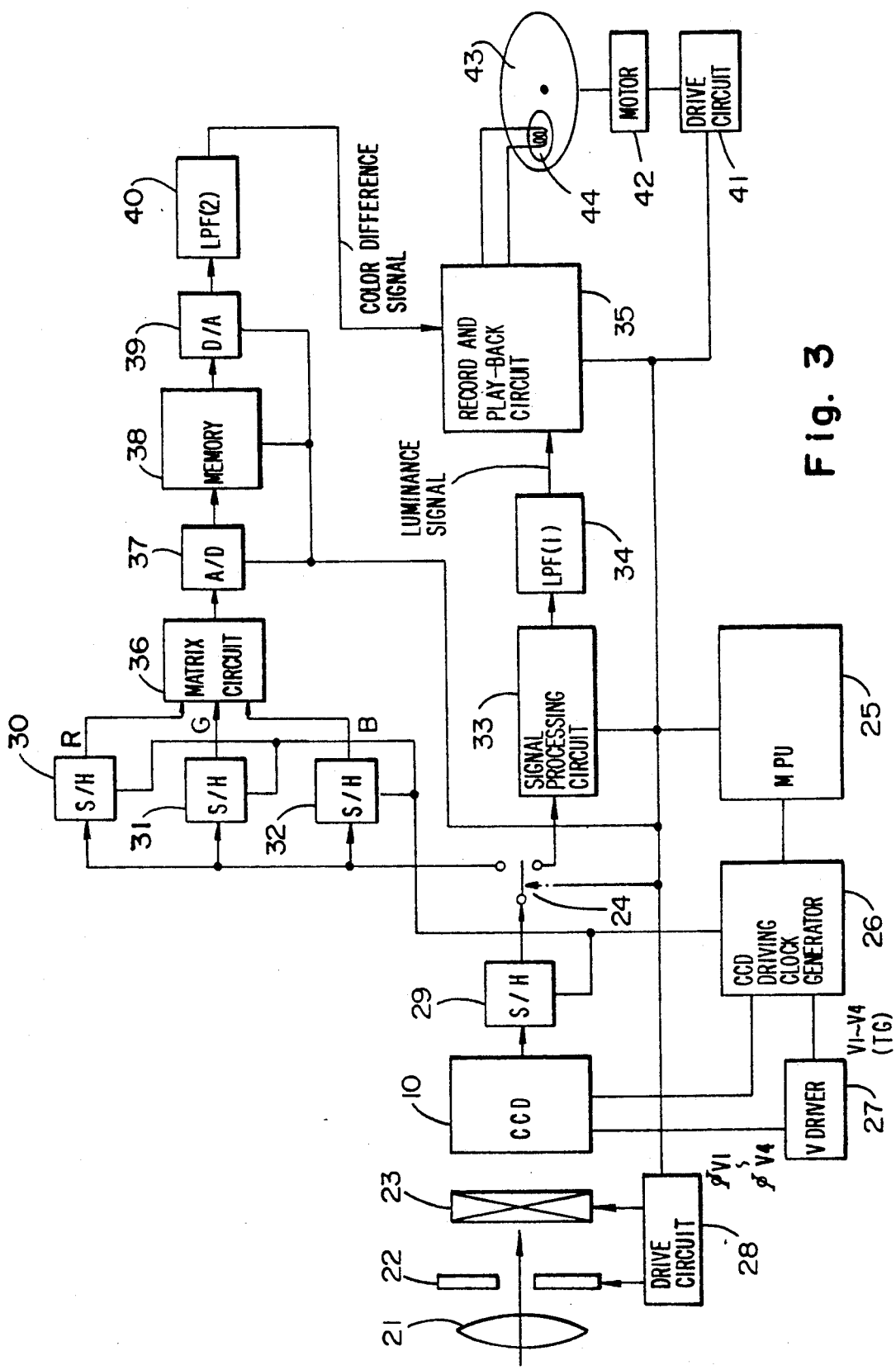
FIG. 3 is a block diagram of a control system of an electronic still camera in which a solid state imaging device shown in FIG. 1 is incorporated.

FIG. 3 shows a block diagram of a control system of an electronic still camera in which a solid state imaging device according to the present invention is incorporated.

Light which is transmitted through a photographing lens 21 is incident upon the solid state imaging device 10 through a diaphragm 22 and a mechanical shutter 23.

The diaphragm 22 and the mechanical shutter 23 are controlled by a drive circuit 28 which is in turn controlled by an MPU 25. The MPU 25 is a microcomputer which performs a general control of the electronic still camera.

The solid state imaging device 10 is driven by a CCD driving clock generator 26 which is controlled by the MPU 25 and a V driver 27 which outputs transfer pulses $\Phi V1 \sim \Phi V4$ to the transparent electrodes $\Phi V1 \sim \Phi V4$ in accordance with the drive pulses $V1 \sim V4$ outputted from the clock generator 26. The transfer pulses $\Phi V1 \sim \Phi V4$ are three-valued signals having three levels of "L", "M" and "H".

When the transfer pulses $\Phi V1$ and $\Phi V2$ and the transfer pulses $\Phi V3$ and $\Phi V4$ are periodically changed to "M" and "L" at a predetermined phase, the color signal charges accumulated in the vertical transfer portions 14 or the luminance signal charges transferred from the photosensitive portions 12 are successively transferred to the horizontal transfer portion 16. The transfer pulses $\Phi V1 \sim \Phi V4$ of levels "M" and "L" which are periodically changed are read pulses.

When all of the transfer pulses $\Phi V1 \sim \Phi V4$ become "H", the luminance signal charges accumulated in the photosensitive portions 12 are transferred to the vertical transfer portions 14 at one time. The transfer pulses $\Phi V1 \sim \Phi V4$ of the level "H" are accumulation control pulses (vertical transfer pulses) TG.

When the transfer pulses $\Phi V1$ and $\Phi V2$ are maintained at level "M", and the transfer pulses $\Phi V3$ and $\Phi V4$ are maintained at level "L", the color signal charges are accumulated under the transparent electrodes $\Phi V1 \sim \Phi V4$ of the vertical transfer portions 14 by the incident object light which is transmitted through the color filters 18. The luminance signal charges are accumulated in the photosensitive portions 12 (photodiodes 13). The transfer pulses $\Phi V1 \sim \Phi V4$ of levels "M" and "L" are accumulation pulses.

The accumulation pulses, the accumulation control pulses TG, and the read pulses are normally periodically outputted from the clock generator 26 (at about 1/60 second cycle), so that the color signal charges periodically accumulated in the vertical transfer portions 14 are read out, and the luminance signal charges accumulated in the photosensitive portions 12 are transferred to the vertical transfer portions 14 to be read out. Upon releasing, the accumulation pulses, the accumulation control pulses TG and the read pulses are outputted from the clock generator 26 at a predetermined timing under the control of the MPU 25.

The signal charges transferred to the reading portion 16 from the vertical transfer portions 14 are successively read from the terminal of the reading portion 16 at a unit of one horizontal line, in accordance with the read pulses outputted from the clock generator 26.

The color signal which is read from the solid state imaging device 10 in accordance with the pulses outputted from the clock generator 26 and the V driver 27 are temporarily stored in a sample hold circuit (S/H) 29, so that the stored signal is outputted to sample hold circuits (S/H) 30, 31 and 32 which are independently provided for the three colors, R, G and B through an electronic selection switch 24 to be separately memorized. The switching operation of the electronic selection switch 24 is controlled by the MPU 25.

The color signals (analog signals) which are separately memorized in the sample hold circuits 30, 31 and 32 are successively converted to digital signals by a matrix circuit 36 and an A/D converter circuit 37, so that the digital signals are successively memorized in a memory (RAM) 38.

On the other hand, the luminance signal charges which are read by the solid state imaging device 10 are outputted to a signal processing circuit 33 from the electronic selection switch 24.

Only the luminance signal is outputted to a record and play-back circuit 35 as a picture data generating means through the signal processing circuit 33 which is controlled by the MPU 25 and a low-pass filter (LPF1) 34. The low-pass filter (LPF1) 34 is a kind of band filter which takes out only the luminance signal from among the signals outputted from the signal processing circuit 33.

The color signal stored in the memory 38 is read in synchronization with the output of the luminance signal mentioned above to be memorized as a color difference signal in the record and play-back circuit 35 through an A/D converter circuit 39 and a low-pass filter (LPF2) 40.

The luminance signal and the color difference signal outputted through the low-pass filters 34 and 40 are FM-modulated with predetermined carrier waves in the record and play-back circuit 35 to be recorded as multiple modulated signals in a floppy disk (recording medium) 43. Note that the rotation of the floppy disk 43 is controlled by a motor 42 which is in turn controlled by a drive circuit 41. The MPU 25 functions as a recording means and a image data generation means.

Figure 4:
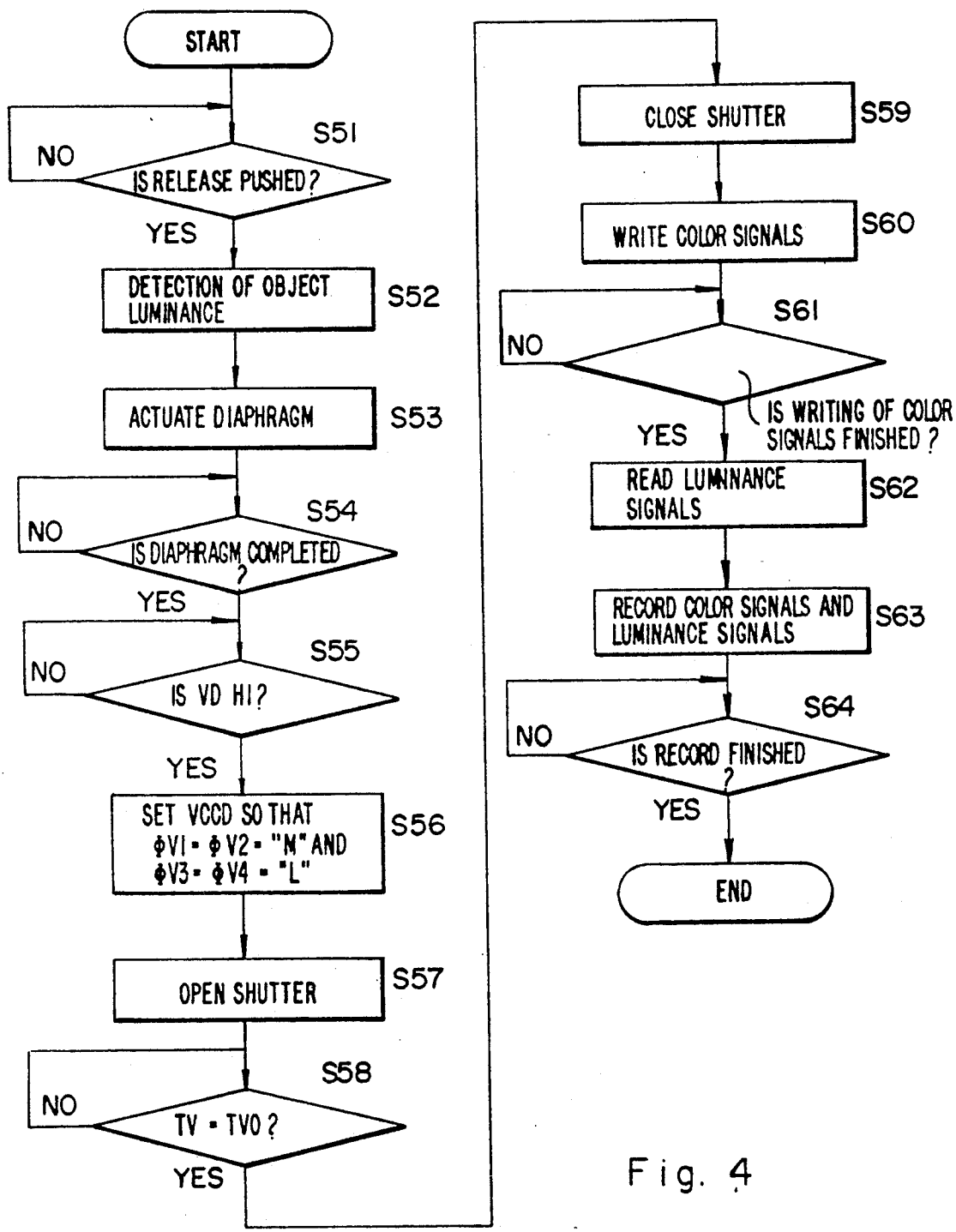
FIG. 4 is a flow chart of a control system shown in FIG. 3.
Figure 5:
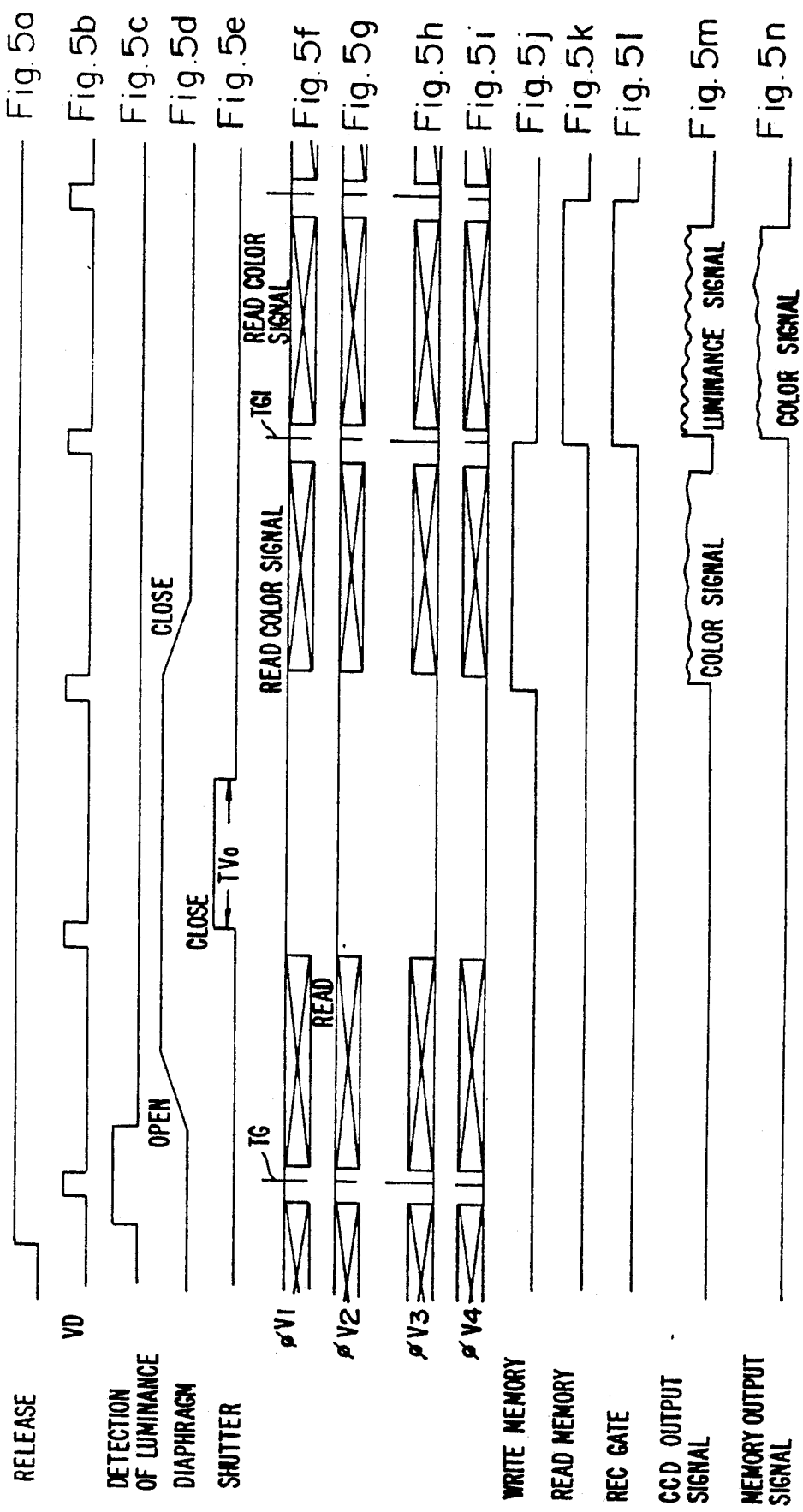
FIG. 5 is a diagram showing a timing relationship of a control system shown in FIG. 3.
Figure 6:
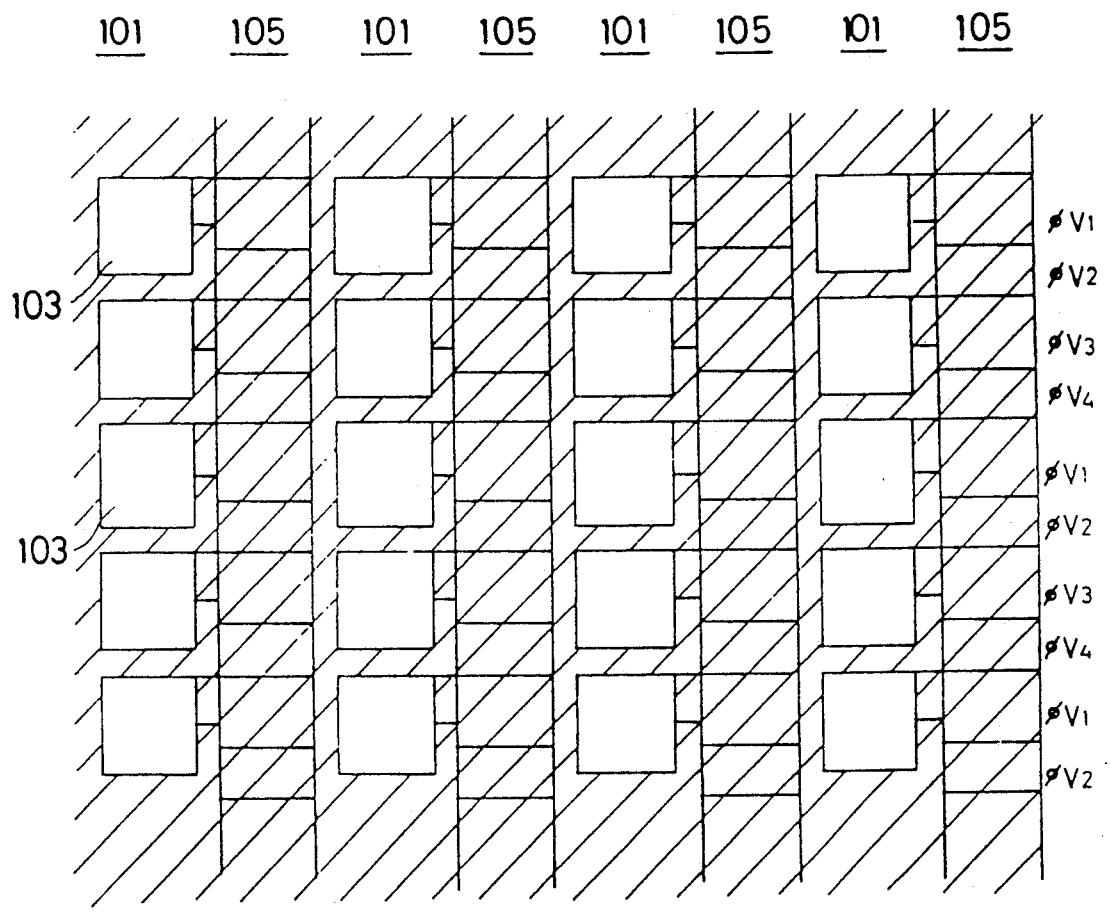
FIG. 6 is a schematic view showing a construction of a known solid state imaging device; and, FIGS. 7 and 8 are schematic views showing color filters used in a known solid state imaging device shown in FIG. 6.
Figure 7:
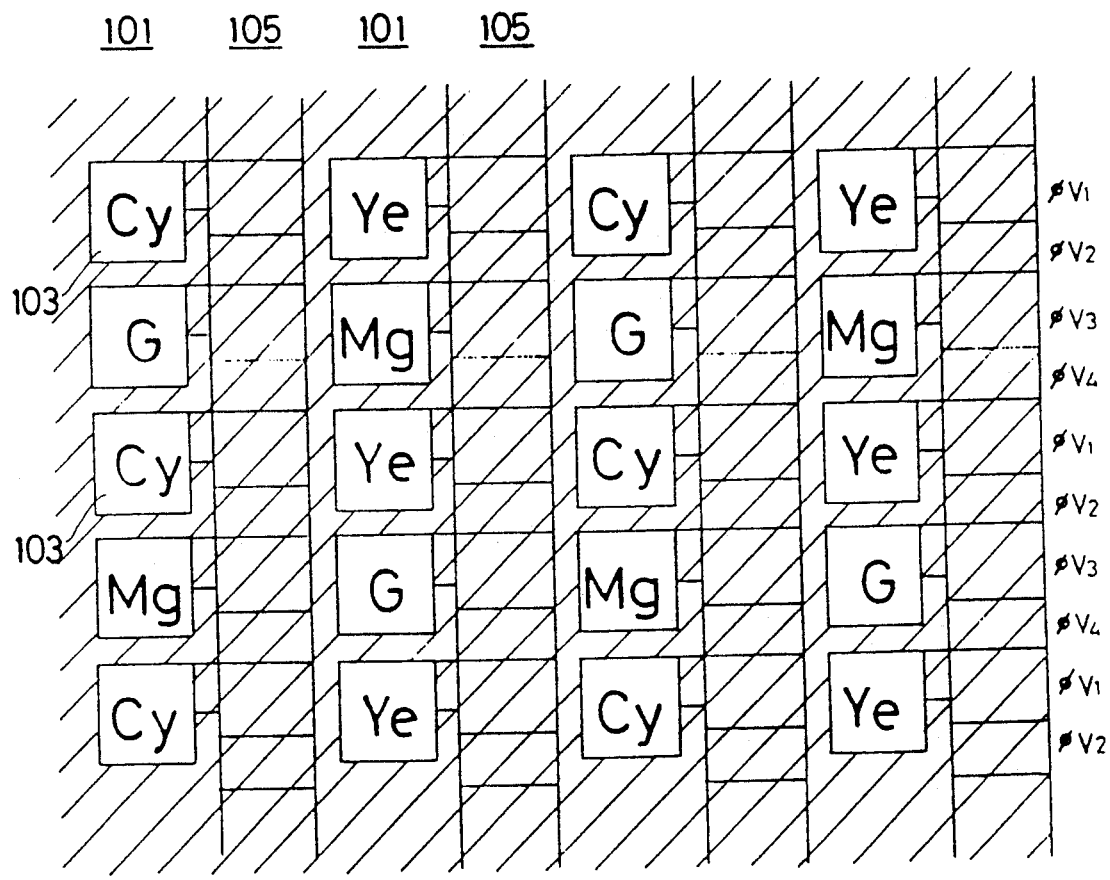
Figure 8:
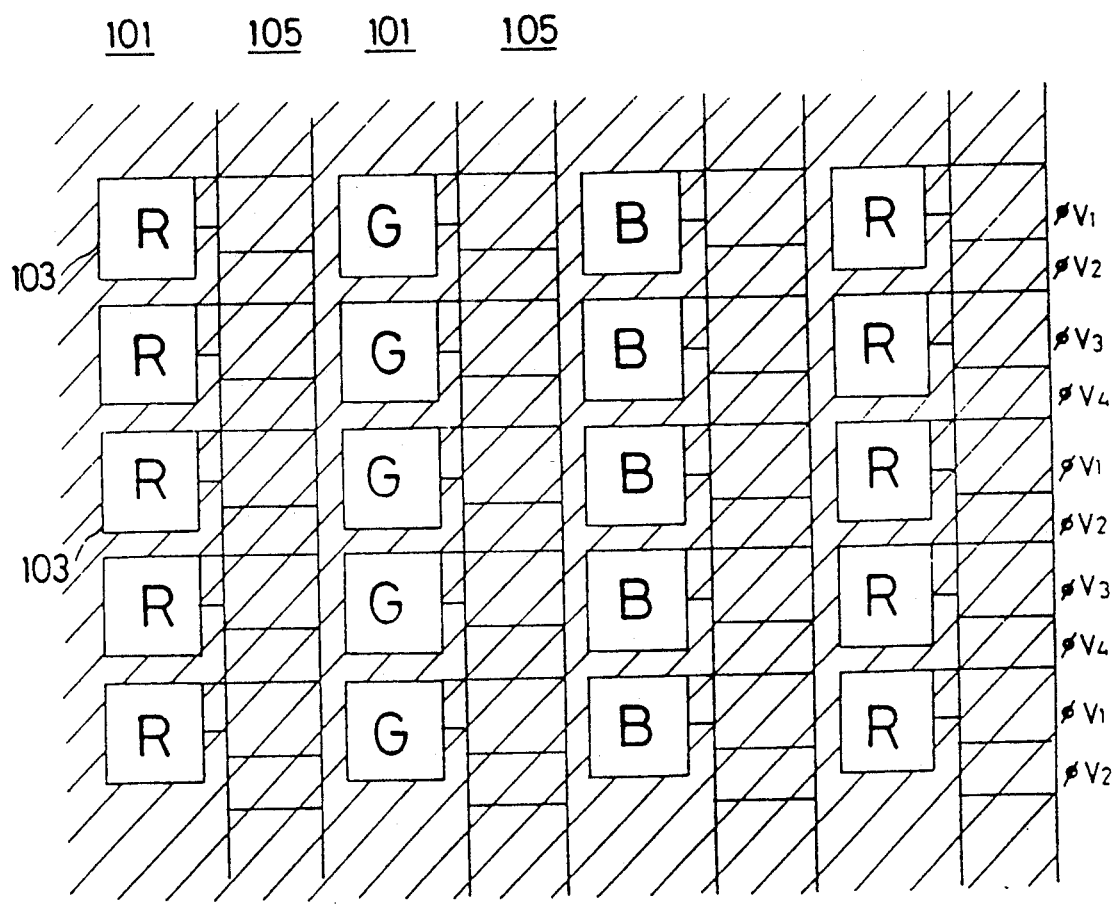

The electronic still camera constructed above operates to record a color picture of high resolution as follows (particularly see FIGS. 3, 4 and 5). FIG. 4 and 5 show flow chart and timing chart of the operations of the control system shown in FIG. 3, respectively. The following operations are controlled by a control program stored in the memory of the MPU 25.

When the release button (not shown) is pushed down at step S51, the MPU 25 detects the luminance of an object to be taken to adjust the diaphragm 22 in accordance with the luminance data (steps S52 and S53).

After the adjustment of the diaphragm is completed at step S54, the control proceeds to step S55 at which whether the pulse VD which is periodically outputted from the clock generator 26 becomes "H" is checked.

If the pulse VD is "H", the accumulation pulses are fed to the transparent electrodes $\Phi V1 \sim \Phi V4$ of the solid state imaging device 10 shown in FIG. 1 from the V driver 27. Namely, voltage of level "M" and voltage of level "L" are supplied to the transparent electrodes ΦV1, ΦV2 and the transparent electrodes ΦV3, ΦV4, respectively (step S56). As a result, the electrical charges can be accumulated under the transparent electrodes ΦV1, ΦV2 of the vertical transfer portions 14.

Thereafter, the mechanical shutter 23 is driven by the drive circuit 28 to open the shutter diaphragm (or shutter blade) for a predetermined shutter period of time $TV_o$ which is determined in accordance with the detected luminance (steps S57, S58 and S59). Consequently, an image of an object is formed on the light receiving surface of the solid state imaging device 10, so that the electrical charges corresponding to the luminance and color of the object image are accumulated in the photosensitive portions 12 and the vertical transfer portions 14.

When the shutter diaphragm is closed, the accumulation of the signal charges of the photosensitive portions 12 and the vertical transfer portions 14 is completed. Thereafter, the read pulse is fed to the transparent electrodes ΦV1~ΦV4 from the V driver 27, so that the color signal charges accumulated in the vertical transfer portions 14 are successively read out to be stored in the memory 38. The memorization is effected through the sample hold circuits 28, 30~32, the matrix circuit 36 and the A/D converter circuit 37 (step S60).

After the memorization of the memory 38 is finished, the accumulation control pulses TG are outputted from the clock generator 26 to the transparent electrodes ΦV1~ΦV4 to transfer the luminance signal charges to the vertical transfer portions 14. As a result, the luminance signal charges accumulated in the photosensitive portions 12 of the solid state imaging device 10 are transferred to the vertical transfer portions 14 at one time.

After that, the read pulses are outputted to the vertical transfer portions 14 from the clock generator 26, so that the luminance signal charges are outputted to the signal processing circuit 33. The high frequency noise of the luminance signal which is processed in the signal processing circuit 33 is eliminated in the low-pass filter 34 to be outputted to the record and play-back circuit 35 (step S62).

Synchronously with the output of the object luminance signal, the color signal written in the memory 38 is read out and converted to the analogue signal by the D/A converter circuit 39, so that the high frequency noise is eliminated by the low-pass filter 40 to be outputted to the record and play-back circuit 35. In the record and play-back circuit 35, the luminance signal and the color signal are synchronously FM-modulated with predetermined carrier waves and are multiplied to be recorded as multi-modulated signals in the floppy disk 43 through the magnetic head 44 (steps S63 and S64).

As mentioned before and as can be understood from the foregoing, the inventors have focused on the photoelectric conversion function and the electrical charge accumulation function of the vertical transfer portions 14. In the illustrated embodiment, since the color signal and the luminance signal are obtained by the vertical transfer portions 14 and the photosensitive portions 12, respectively, it is possible to realize a higher horizontal resolution by the CCD imaging devices having the same number of picture elements as the prior art.

Although the above discussion has been directed to an electronic still camera having a solid state imaging device in which the color signal and the luminance signal are outputted from the vertical transfer portions 14 and the photosensitive portions 12, respectively, the present invention is not limited thereto. For instance, it is possible to get the luminance signals and the color signals from the vertical transfer portions 14 on which no color filter is provided and from the photosensitive portions 12 on which the color filters are provided, respectively (refer to FIG. 1B). In this alternative, first, the luminance signals which are read from the vertical transfer portions are successively memorized in the memory 33, and then, the memorized luminance signals are synchronously superimposed on the color signals of the photosensitive portions 12.

As can be seen from the foregoing, according to the present invention, both the color signals and the luminance signals are obtained with high density by a single solid state imaging device.

Furthermore, according to the present invention, since there is nothing to decrease the amount of incident light on the light receiving surfaces in the photosensitive portions having no color filter or the vertical transfer portions having no color filter, very high sensitive luminance signals can be obtained.

In addition, according to the present invention, since the color signals and the luminance signals are independently obtained, the color signals having a high color reproductivity and a high S/N ratio and the luminance signals having a high resolution can be obtained.

With an electronic still camera using a solid state imaging device according to the present invention, a picture of high resolution can be formed. Only one solid state imaging device is incorporated in an electronic still camera of the present invention, thus resulting in an inexpensive electronic still camera.

I claim:

1. A solid state imaging device, comprising:

photosensitive portions which accumulate electrical charges corresponding to a quantity of light received, and vertical transfer portions having light receiving surfaces which accumulate electrical charges corresponding to said quantity of light received and which transfer said electrical charges accumulated by said photosensitive portions, such that said vertical transfer portions serve as photosensitive portions in addition to transferring said electrical charges accumulated in said photosensitive portions;

said photosensitive portions and said vertical transfer portions being alternately positioned in a horizontal direction;

transparent electrodes that are provided on each of said light receiving surfaces of said vertical transfer portions; and color filters of three colors which are alternately arranged in a predetermined order on one of said photosensitive portions or said vertical transfer portions to permit light of associated three colors to pass through said filters, electrical charges that are accumulated through said color filters being used as information on a color signal, while electrical charges that are not accumulated through said color filters are used as information on a luminance signal.

2. A solid state imaging device according to Claim 1, wherein said three colors are the primary colors of red, green and blue.

3. A solid state imaging device according to claim 1, wherein said three colors are yellow, cyan and magenta.

4. A solid state imaging device according to claim 1, wherein said three color filters are alternately located in a stripe arrangement for every said vertical transfer portion.

5. A solid state imaging device according to claim 1, wherein said three color filters are alternately located in a stripe arrangement for every said photosensitive portion.

6. A solid state imaging device, comprising;
a single integrated circuit board on which are provided vertically extending photosensitive portions which include a receiving surfaces and which include a large number of picture elements to accumulate electrical charges corresponding to a quantity of light received by said photosensitive portions, and vertically extending vertical transfer portions having light receiving surfaces which accumulate electrical charges corresponding to a quantity of light received by said vertically extending transfer portions, said photosensitive portions and said vertically extending transfer portions being alternately arranged in a vertical direction so as to be close to each other, so that both said photosensitive portions and said vertically extending transfer portions accumulate electrical charges and read said accumulated electrical charges in accordance with pulses applied to electrodes provided on said light receiving surfaces of said photosensitive portions and said vertically extending transfer portions, said vertically extending transfer portions also functioning to transfer said electrical charges accumulated in said photosensitive portions;
electrodes that are positioned on said picture elements of said photosensitive portions and said vertically extending transfer portions and comprising transparent electrodes through which visible light can be transmitted; and
color filters of three colors which are alternately arranged in a predetermined order on said light receiving surfaces of said vertically extending transfer portions to permit associated three colors to pass through said filters, said electrical charges that are accumulated in said vertically extending transfer portions through said color filters being used as information on a color signal, while said electrical charges that are accumulated in said photosensitive portions are used as information on a luminance signal.

7. A solid state imaging device according to claim 6, wherein said three colors are the primary colors of red, green and blue.

8. A solid state imaging device according to claim 6, wherein said three colors are yellow, cyan and magenta.

9. A solid state imaging device according to claim 6, wherein said three color filters are alternately located in a stripe arrangement for every vertical transfer portion.

10. A solid state imaging device comprising;
a single integrated circuit board comprising vertically extending photosensitive portions having light receiving portions and a large number of picture elements to accumulate electrical charges corresponding to a quantity of light received by said photosensitive portions, and vertically extending vertical transfer portions which accumulate electrical charges corresponding to a quantity of light received by said vertical transfer portions being alternately arranged in a vertical direction so as to be close to each other, wherein said photosensitive portions and said vertical transfer portions accumulate electrical charges and read said accumulated electrical charges in accordance with pulses applied to electrodes provided on said light receiving surfaces of said photosensitive portions and on said vertical transfer portions, said vertical transfer portions also functioning to transfer said electrical charges accumulated in said photosensitive portions;
electrodes that are positioned on said picture elements of said photosensitive portions and on said vertical transfer portions, said electrodes comprising transparent electrodes through which visible light can be transmitted; and
color filters of three colors which are alternately arranged in a predetermined order on said light receiving surfaces of said photosensitive portions to permit associated three colors to pass through said filters, electrical charges that are accumulated through said color filters being used as information on a color signal, while electrical charges that are not accumulated through said color filters are used as information on a luminance signal.

11. A solid state imaging device according to claim 10, wherein said three colors are the primary colors of red, green and blue.

12. A solid state imaging device according to claim 10, wherein said three colors are yellow, cyan and magenta.

13. A solid state imaging device according to claim 10, wherein said three color filters are alternately located in a stripe arrangement for every vertical transfer portion.

14. A solid state imaging device according to claim 10, wherein said three color filters are alternately located in a stripe arrangement for every photosensitive portion.

15. An electronic still camera comprising a photographing lens and a solid state imaging device in which an object image is formed on the light receiving surfaces thereof by the photographing lens, according to claim 6,
further comprising color signal memorizing means for memorizing color signal data generated by said vertical transfer portions of the solid state imaging device; and
picture signal generating means for synchronizing the luminance signals generated by said photosensitive portions of the solid state imaging device and the corresponding color signal data which is memorized in said color signal memorizing means to form object picture signals.

16. An electronic still camera according to claim 15, further comprising pulse generating means for outputting accumulation pulses for accumulating the luminance signal charges in the photosensitive portions of said solid state imaging device and for accumulating the color signal charges in said vertical transfer portions;
pulse reading means for reading the signal charges accumulated in said vertical transfer portions; and
accumulation control pulses for transferring the signal charges accumulated in the photosensitive portions to said vertical transfer portions.

17. An electronic still camera according to claim 15, further comprising modulation means for modulating the picture signals generated by said picture signal generating means to form multi-modulated signals.

18. An electronic still camera according to claim 17, further comprising a magnetic disk on which the multi-modulated signals are to be recorded, and recording means for recording said multi-modulated signals onto said magnetic disk.

19. An electronic still camera comprising a photographing lens and a solid state imaging device in which an object image is formed on the light receiving surfaces of said imaging device by said photographing lens, according to claim 10,
and further comprising luminance signal memorizing means for memorizing luminance signals generated by said photosensitive portions and color signals generated by said vertical transfer portions of said solid state imaging device; and
picture signal generating means for synchronizing the color signals generated by said vertical transfer portions of said solid state imaging device and the corresponding luminance signals which are memorized in said luminance signal memorizing means to form object pictures signals.

20. An electronic still camera according to claim 19, further comprising pulse generating means for outputting accumulation pulses for accumulating the color signal charges in said vertical transfer portions of said solid state imaging device and for accumulating the luminance signal charges in said photosensitive portions of the solid state imaging device;
pulse reading means for reading the signal charges accumulated in said vertical transfer portions; and
accumulation control pulses for transferring the luminance signal charges accumulated in said photosensitive portions to said vertical transfer portions.

21. An electronic still camera according to claim 19, further comprising modulation means for modulating the picture signals generated by said picture signal generating means to form multi-modulated signals.

22. An electronic still camera according to claim 21, further comprising a magnetic disk on which said multi-modulated signals are to be recorded; and
recording means for recording said multi-modulated signals onto said magnetic disk.

23. A solid state imaging device according to claim 1,
said imaging device further comprising illuminance means for producing an illuminance signal and color means for producing a plurality of color signals;
a first portion of said photosensitive portions and said vertical transfer portions comprising a filter portion and a second portion of said photosensitive portions and said vertical transfer portions comprising a non-filter portion;
said color filters being arranged on said filter portion, but not on said non-filter portion.

24. A solid state imaging device according to claim 23, wherein said illuminance means comprise said non-filter portion, and said color means comprise said filter portion.

25. A solid state imaging device according to claim 6, said imaging device further comprising illuminance means for producing an illuminance signal and color means for producing a plurality of color signals;
a first portion of said photosensitive portions and said vertical transfer portions comprising a filter portion and a second portion of said photosensitive portions and said vertical transfer portions comprising a non-filter portion;
said color filters being arranged on said filter portion, but not on said non-filter portion.

26. A solid state imaging device according to claim 25, wherein said illuminance means comprise said non-filter portion, and said color means comprise said filter portion.

27. A solid state imaging device according to claim 10,
said imaging device further comprising illuminance means for producing an illuminance signal and color means for producing a plurality of color signals;
a first portion of said photosensitive portions and said vertical transfer portions comprising a filter portion and a second portion of said photosensitive portions and said vertical transfer portions comprising a non-filter portion;
said color filters being arranged on said filter portion, but not on said non-filter portion.

28. A solid state imaging device according to clam 27, wherein said illuminance means comprise said non-filter portion, and said color means comprise said filter portion.

29. A solid state imaging device, comprising;
a circuit board, having:
vertically extending photosensitive portions that include receiving surfaces and a plurality of picture elements that accumulate electrical charges that correspond to a quantity of light that is received by said photosensitive portions; and
vertically extending vertical transfer portions having light receiving surfaces which accumulate electrical charges corresponding to a quantity of light received by said vertically extending transfer portions, said photosensitive portions and said vertically extending transfer portions being alternately arranged in a vertical direction so as to be close to each other, so that said photosensitive portions and said vertically extending transfer portions accumulate electrical charges and read said accumulated electrical charges, said vertically extending transfer portions also functioning to transfer said electrical charges accumulated in said photosensitive portions;
transparent electrodes through which visible light can be transmitted that are positioned on said picture elements of said photosensitive portions and said vertically extending transfer portions; and
color filters of three colors which are alternately arranged in a predetermined order on said light receiving surfaces of said vertically extending transfer portions to permit associated three colors to pass through said filters, said electrical charges that are accumulated in said vertically extending transfer portions through said color filters being used as information on a color signal, while said electrical charges that are accumulated in said photosensitive portions are used as information on a luminance signal, said electrical charges that are accumulated in said vertically extending transfer portions to yield said color signal being separately obtained from said electrical charges that are accumulated in said photosensitive portions to yield said luminance signal.

* * * * *

UNITED STATES PATENT AND TRADEMARK OFFICE
CERTIFICATE OF CORRECTION

PATENT NO. : 5,187,569

DATED : February 16, 1993

INVENTOR(S) : NOBUHIRO TANI

It is certified that error appears in the above-identified patent and that said Letters Patent is hereby corrected as shown below:

At column 8, line 62 (claim 2, line 1), change "Claim" to ---claim---.
Under [30] Foreign Application Priority Data, change "1-517310" to ---1-51731---.

Signed and Sealed this

Twenty-fifth Day of January, 1994

*Attest:*

*Attesting Officer*

BRUCE LEHMAN

*Commissioner of Patents and Trademarks*